(12) United States Patent
Tsukamoto

(10) Patent No.: US 9,371,850 B2
(45) Date of Patent: Jun. 21, 2016

(54) ANCHOR HEAD AND ANCHOR NUT FOR A TENSION ANCHOR

(71) Applicant: FIREP REBAR TECHNOLOGY GMBH, Dusseldorf (DE)

(72) Inventor: Kenichi Tsukamoto, Meerbusch (DE)

(73) Assignee: Firep Rebar Technology GMBH, Dusseldorf (DE)

( * ) Notice: Subject to any disclaimer, the term of this patent is extended or adjusted under 35 U.S.C. 154(b) by 0 days.

(21) Appl. No.: 14/768,581

(22) PCT Filed: Feb. 12, 2014

(86) PCT No.: PCT/EP2014/052757
§ 371 (c)(1),
(2) Date: Aug. 18, 2015

(87) PCT Pub. No.: WO2014/128043
PCT Pub. Date: Aug. 28, 2014

(65) Prior Publication Data
US 2016/0003279 A1    Jan. 7, 2016

(30) Foreign Application Priority Data

Feb. 19, 2013   (DE) .......................... 10 2013 002 734

(51) Int. Cl.
*A47B 96/06* (2006.01)
*F16B 13/08* (2006.01)
(Continued)

(52) U.S. Cl.
CPC .............. *F16B 13/08* (2013.01); *E21D 21/008* (2013.01); *E21F 17/00* (2013.01)

(58) Field of Classification Search
CPC combination set(s) only.
See application file for complete search history.

(56) References Cited

U.S. PATENT DOCUMENTS 3,653,217 A * 4/1972 Williams ................. E21D 21/00
                                                    405/259.3
4,659,258 A * 4/1987 Scott ...................... E21D 20/025
                                                    405/259.3
(Continued)

FOREIGN PATENT DOCUMENTS

AU        693500 B2    7/1998
CN    102359470 A    2/2012
(Continued)

OTHER PUBLICATIONS

International Search Report dated Mar. 5, 2015 issued in corresponding PCT/EP2014/052757 application (pp. 1-3.).

*Primary Examiner* — Monica Millner
(74) *Attorney, Agent, or Firm* — Millen, White, Zelano & Branigan, P.C.

(57) ABSTRACT

The invention relates to an anchor head (1) for anchoring a tension anchor (2) on the air side of an anchor bore (5), comprising an anchor nut (3) with a threaded bore (17) for screwing onto an anchor thread (19) of a tension anchor (2) and comprising an anchor plate (4) which interacts with the anchor nut (3) and comprises an anchor plate opening (8), said anchor plate being designed to transmit the tensile forces which can be exerted onto the anchor nut (3) by a screwed-in tension anchor (2) to a sub-surface (6) surrounding the anchor bore (5). The anchor nut (3) has a conical bearing region (7) which engages into the opening (8) of the anchor plate (4) in the assembled state and rests against a complementary inner cone (9) in the anchor plate opening, said anchor plate (4) having the inner cone at least in the region of the anchor plate opening (8). The anchor nut (3) has at least one slot (12) which runs preferably in an axially parallel manner and interrupts the nut wall over a sub-region of the axial extension of the wall. The at least one slot (12) opens into the air-side end (13) of the anchor nut (3) and from there extends over a length which equals between 25% and 90% of the total axial length of the anchor nut (3). The invention further relates to anchor nut (3) for such an anchor head (1).

20 Claims, 3 Drawing Sheets

(51) Int. Cl.
*E21D 21/00* (2006.01)
*E21F 17/00* (2006.01)

(56) References Cited

U.S. PATENT DOCUMENTS

| | | | | |
|---|---|---|---|---|
| 5,013,192 | A * | 5/1991 | Scott | E21D 21/0026 405/259.1 |
| 5,230,589 | A * | 7/1993 | Gillespie | E21D 21/008 405/259.1 |
| RE34,350 | E * | 8/1993 | Dufossez | E01D 19/14 52/146 |
| 5,275,512 | A * | 1/1994 | Wright | E21D 21/008 405/259.1 |
| 5,441,372 | A * | 8/1995 | Wilkinson | F16B 13/066 405/259.5 |
| 5,518,351 | A * | 5/1996 | Peil | F16B 35/06 248/59 |
| 5,525,013 | A | 6/1996 | Seegmiller et al. | |
| 5,560,664 | A * | 10/1996 | Lotze | B66C 1/12 294/215 |
| 5,570,976 | A | 11/1996 | Fuller et al. | |
| 5,669,592 | A * | 9/1997 | Kearful | F16M 11/14 248/217.4 |
| 5,882,148 | A * | 3/1999 | Mraz | E21D 11/00 405/259.1 |
| 6,443,680 | B1 * | 9/2002 | Bodin | F16B 23/0038 411/375 |
| 8,069,624 | B1 * | 12/2011 | Sorkin | E04C 5/12 403/314 |
| 8,308,117 | B2 * | 11/2012 | Braun | A47G 25/0635 248/217.4 |
| 2002/0081159 | A1 * | 6/2002 | Xu | E21D 21/00 405/259.1 |
| 2003/0190211 | A1 * | 10/2003 | Bodin | B25B 27/0007 411/29 |
| 2004/0076480 | A1 * | 4/2004 | Kim | E02D 5/805 405/259.1 |
| 2007/0243026 | A1 * | 10/2007 | Wu | E21D 20/025 405/259.5 |
| 2009/0191005 | A1 * | 7/2009 | Schmidt | E02D 5/805 405/259.1 |
| 2010/0278614 | A1 * | 11/2010 | Bickford | F16B 25/0015 411/417 |
| 2011/0158766 | A1 * | 6/2011 | Mitrovic | F16B 5/0275 411/393 |
| 2011/0277401 | A1 * | 11/2011 | Mathiowetz | F16B 5/0258 52/173.3 |
| 2011/0299940 | A1 * | 12/2011 | Earl, Jr. | E21D 21/0026 405/259.5 |
| 2013/0115013 | A1 * | 5/2013 | He | E02D 5/74 405/259.3 |
| 2014/0219743 | A1 * | 8/2014 | Mitrovic | F16B 5/0275 411/367 |

FOREIGN PATENT DOCUMENTS

| | | |
|---|---|---|
| DE | 19828371 A1 | 12/1999 |
| DE | 102010024352 A1 | 12/2011 |
| WO | 9303256 A1 | 2/1993 |
| WO | 0000718 A1 | 1/2000 |
| WO | 2011157850 A2 | 12/2011 |

* cited by examiner

ANCHOR HEAD AND ANCHOR NUT FOR A TENSION ANCHOR

The present invention relates to an anchor head according to the preamble of Claim 1 and to an anchor nut according to the preamble of Claim 13. The anchor head serves for anchoring a tension anchor on the air side of an anchor bore and to this end comprises an anchor nut and an anchor plate interacting with the same. The anchor nut is intended to be screwed onto an anchor thread of a tension anchor by means of a threaded bore extending in the direction of its longitudinal axis. The anchor plate is fitted onto the free end of a tension anchor introduced into an anchor hole beforehand by means of an anchor plate opening and then loaded by the screwed-on anchor nut. Here it is intended to transmit the tensile forces exerted on the anchor nut by the tension anchor to the sub-surface surrounding the anchor bore.

Such anchor heads and tension anchors and their use are known. These generally serve to connect multiple layers of the sub-surface with one another and to introduce forces, which in the region of the sub-surface near the surface can lead to instabilities, into sub-surface layers located deeper, which can absorb retaining forces of adequate magnitude. Tension anchors in this case are predominantly employed as rock anchors in sub-surface tunnel sections in mining, for example in pit coal mines. Because of the usually very confined space conditions there, rock anchors are often placed as glued anchors in bore holes produced by rotary drilling. During the advancing operations, they are predominantly used for temporarily securing the working face, parts of the grooves and in particular for securing the abutments in the region of the mineral/coal seam. Furthermore, such tensions anchors can also be employed as end anchorage on reinforcing bars for applications in concrete.

Such a tension anchor is known for example from DE 198 28 371 A1, reference to which is made for further details, in particular also with respect to the usage and with respect to the production.

Furthermore it is known with such anchor heads for tension anchors for example from DE 20 2008 003 381 U1 to form the anchor nut with a conical support region, with which, in the assembled state, it engages in the anchor plate opening of the anchor plate where it is supported by a complementary inner cone, which the anchor plate has at least in the region of this anchor plate opening.

From AT135919B an anchor nut is known, the wall of which is interrupted by a slot over the entire height of the anchor nut in a location.

To increase the load carrying capacity and for achieving higher strength values it is additionally also known to provide the anchor nut with at least one slot preferentially running in an axially parallel manner, which interrupts the nut wall over a part region of its axial extension. Such a generic anchor head with an associated tension anchor is known from DE 10 2010 024 352 A1. Nevertheless, an even further increase of the load carrying capacity and strength of the tension anchor is desirable.

The object of the present invention therefore is to make available an anchor head of the type mentioned at the outset that is easy to produce and easy to handle, which with simple design achieves even greater load carrying capacity and improved strength values in the anchorage. Furthermore, an anchor nut for such an anchor head is to be made available.

According to the invention, this object is solved through an anchor head according to Claim 1 and through an anchor nut according to Claim 13. Advantageous configurations and further developments of the invention are obtained from the dependent claims.

Substantial with the solution according to the invention is that the at least one slot opens into the end of the anchor nut on the air side and starting out from there extends over a length amounting to between 25% and 90%, preferentially between 30% and 88% and most preferably between 50% and 85% of the total axial length of the anchor nut.

In contrast with anchor heads known up to now, the slot interrupting the nut wall is not located at the end on the sub-surface side but at its end on the air side, while it does not extend over the entire length of the anchor nut.

Because of this, tension distributions within the anchor head which are further improved with the previously known embodiments and because of the better force transmission from the anchor nut to the tension anchor, further increased support loads and strength values can be achieved.

With active axial loading by tensioning the anchor nut or with passive loading through convergence manifestations from the anchored sub-surface the tension anchor with the screwed-on anchor nut is increasingly pulled deeper into the inner cone of the anchor plate, so that a first radially acting compression forces an initially elastic deformation in the non-slotted region of the nut cone on the sub-surface side, which leads to a further axial support load increase of the anchor nut.

With a further axial load increase or further tensile loading in the anchor shaft, the radially acting compression is further increased and thus leads to further elastic and, superimposed, also plastic deformation of the nut cone, which now expands over the axial length of the anchor nut in the direction of the slotted region. Here, the deformation resistance of the anchor nut against the radial compression does not increase further at the same time despite increasing diameter in the outer cone, but overall equalisation of the specific surface pressure through the inner cone of the anchor plate onto the entire surface of the nut cone takes place because of the slots which according to the invention are arranged in this region on the air side, as a result of which the load capacity of the anchor nut is substantially increased. All thread ribs of the anchor nut are then utilised for force transmission to almost the same degree, which is not the case with the known anchor nuts with slots arranged on the sub-surface side.

Because of the simple design, the anchor head according to the invention can be produced cost-effectively. The anchor head during its use can also be easily handled.

In an advantageous manner, the nut wall in the region of the conical support region on the sub-surface side, which with the smaller diameter points towards the bore hole deepest, is formed continuously over the entire circumference without interruption.

According to a preferred embodiment version it is provided here that the circumferential regions of the nut wall, which in the extension of the slot or of the slots remain, are designed as predetermined breaking point(s) which breaks or break when a predetermined load is exceeded.

It is particularly advantageous when the anchor nut has multiple slots which are evenly distributed over the circumference. Preferentially, two to six slots are provided here, which are each located opposite one another by pairs.

It is particularly favourable furthermore when the slotted region on the end of the anchor nut on the air side is compressed inwardly during the tensioning of the tension anchor by the conical support region of the anchor nut entering the inner cone of the anchor plate in such a manner that not only the axial thread play but also the radial thread play between the tension anchor and the anchor nut is reduced or even completely eliminated. Because of this, maximum support loads and strength values of the anchor system on the one hand and non-slip fixing for example also of reinforcing bars in concrete applications can be achieved on the other hand.

According to an advantageous embodiment of the invention, the end of the conical support region of the anchor nut on the air side is followed by a head region with a stop surface on the sub-surface side, which with respect to the longitudinal axis of the anchor nut is inclined at an angle that is greater than an angle at which the conical support region is inclined with respect to the longitudinal axis of the anchor nut. The stop surface can come to lie against the anchor plate and render difficult or prevent the conical region of the anchor nut being further pulled into the anchor plate.

According to a particularly preferred embodiment of the invention it is provided that a head region with a suddenly enlarged diameter follows the end of the conical support region of the anchor nut on the air side in such a manner that the end face of the head region on the sub-surface side forms a stop surface extending perpendicularly to the longitudinal axis of the anchor nut, which can abut a complementary stop surface of the anchor plate in order to prevent by this positive connection that the conical region of the anchor nut is further pulled into the inner cone of the anchor plate. Because of this, a defined stroke of the axial movement of the anchor nut in the inner cone of the anchor plate and thus also the system yield can be limited in a defined manner.

In order to be able to easily screw open the anchor nut, it can be designed in a manner known per se with positive connection elements, preferentially with an outer hexagon, the positive connection elements advantageously being arranged in the region of the head region with the enlarged diameter.

It is particularly advantageous when the region of the conical support region following the head region of the anchor nut on the sub-surface side comprises markings which can be embodied in the form of a scale and/or as colour markings. Throughout the loading process, the anchor head according to the invention develops an almost linear function in the force-distance diagram, which can be utilised as indicator for the state of loading in the anchor head and also as indicator for a first loosening (initial convergence) of the rock layers near the surface that may have take place. In terms of the new Austrian tunnel construction method this means in particular a methodical advantage in initial construction and makes possible very economical and effective monitoring.

According to a further particularly preferred embodiment of the invention, the anchor plate comprises a collar surrounding the anchor plate opening, which forms a housing for the inner cone formed therein. The collar can extend on one side or in the form of a double collar on both sides of the anchor plate. For the sake of space saving however it is particularly advantageous when the collar predominantly or even completely extends over the side of the anchor plate on the sub-surface side and in this way can be inserted in the end region of the anchor bore on the air side. The axial length of the collar in this case advantageously amounts to a multiple, preferentially three times to ten times the thickness of the anchor plate.

Here it is particularly advantageous when the collar is formed in a separate insert element, which, with a cylindrical collar region, is inserted in the anchor plate opening and with a stop shoulder projecting outwardly from the collar region abuts the surface of the anchor plate on the air side. The surface of the stop shoulder on the air side in this case can advantageously come into contact with the stop surface of the head region of the anchor nut on the sub-surface side when the anchor nut has been pulled into the anchor plate by the maximally intended engagement distance.

It can be advantageous, furthermore, when at least one of the contact surfaces of the cone pairing between the anchor nut and the anchor plate is provided with a friction-reducing coating or with a friction-reducing insert, in particular with a nylon insert. Greater tensioning with same torque is thereby made possible.

It is particularly advantageous, furthermore, when the anchor nut and/or the anchor plate consist of fibre-reinforced plastic, in particular of glass fibre-reinforced plastic (GRP). Depending on the application, the anchor nut and/or the anchor plate however can also be produced from a metal alloy. The anchor plate is advantageously embodied circularly, however it can also be designed angular, in particular square.

The subject of the present invention furthermore is an anchor nut for an anchor head of the type described above. Here, the anchor nut comprises a nut body which extends in axial longitudinal direction between an end on the air side and an end on the sub-surface side. The nut body comprises a threaded bore extending in longitudinal direction for screwing onto an anchor thread of a tension anchor and a conical support region, which, with the region on the sub-surface side having the smaller diameter up front can be inserted into an anchor plate opening of an anchor plate in order to interact with a complementary inner cone in the assembled state there, which the anchor plate comprises at least in the region of its anchor plate opening. The larger diameter region of the conical support region in this case faces the end of the anchor nut on the air side. The anchor nut furthermore comprises at least one slot preferentially running axially parallel, which interrupts the nut wall over a part region of its axial extension, and which opens into the end of the anchor nut on the air side, from where it extends over a length amounting to between 25% and 90% of the entire axial length of the anchor nut.

Otherwise, the anchor nut can be advantageously designed with further features of the anchor head of the type described above.

BRIEF DESCRIPTION OF DRAWINGS

Further advantages and features of the invention are obtained from the following description and the exemplary embodiments shown in the drawings. It shows:

FIG. 5 shows an exemplary embodiment of a tension anchor 2 provided with an anchor head 1 according to the invention, with which the tension anchor 2, in the case of which the tension anchor 2, the anchor nut 3 and the anchor plate 4 each entirely consist of composite fibre material. The tension anchor 2 in this case is inserted into an anchor bore 5 as rock anchor and there in the bore hole deepest fixed for example through gluing cartridges in the manner known per se (not shown in the drawing). The tensile forces exerted by the tension anchor 2 are transmitted via the screwed-on anchor nut 3 to the anchor plate 4 interacting therewith, which supports itself on the sub-surface 6 surrounding the end of the anchor bore 5 on the air side. In this way, the layers of the sub-surface 6 in this case consisting of rock near the surface located in the region of the anchor bore 5 are stabilised.

Figure 1:
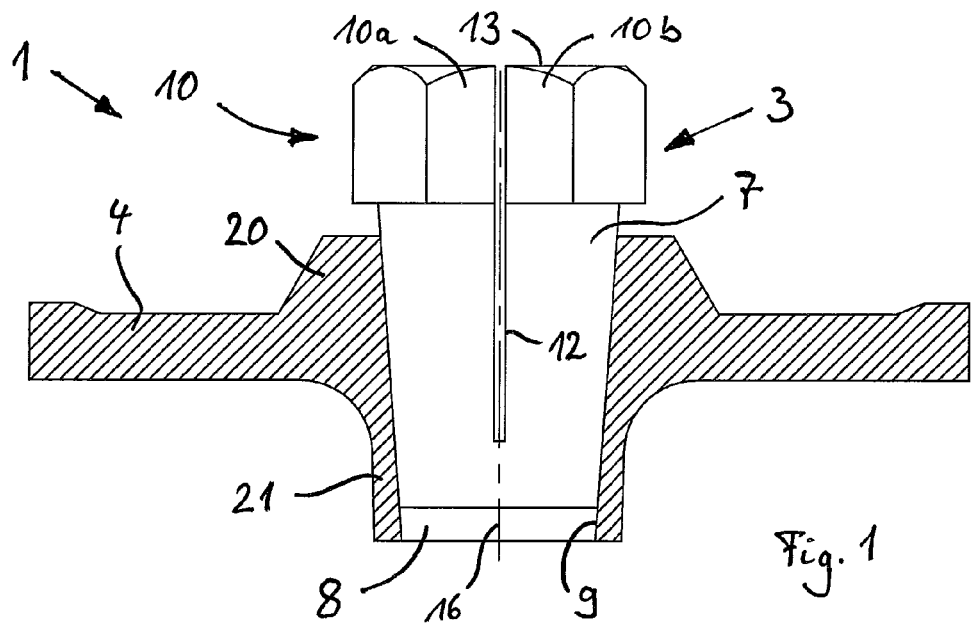
FIG. 1: cross section through a first embodiment of an anchor head according to the invention.
Figure 2:
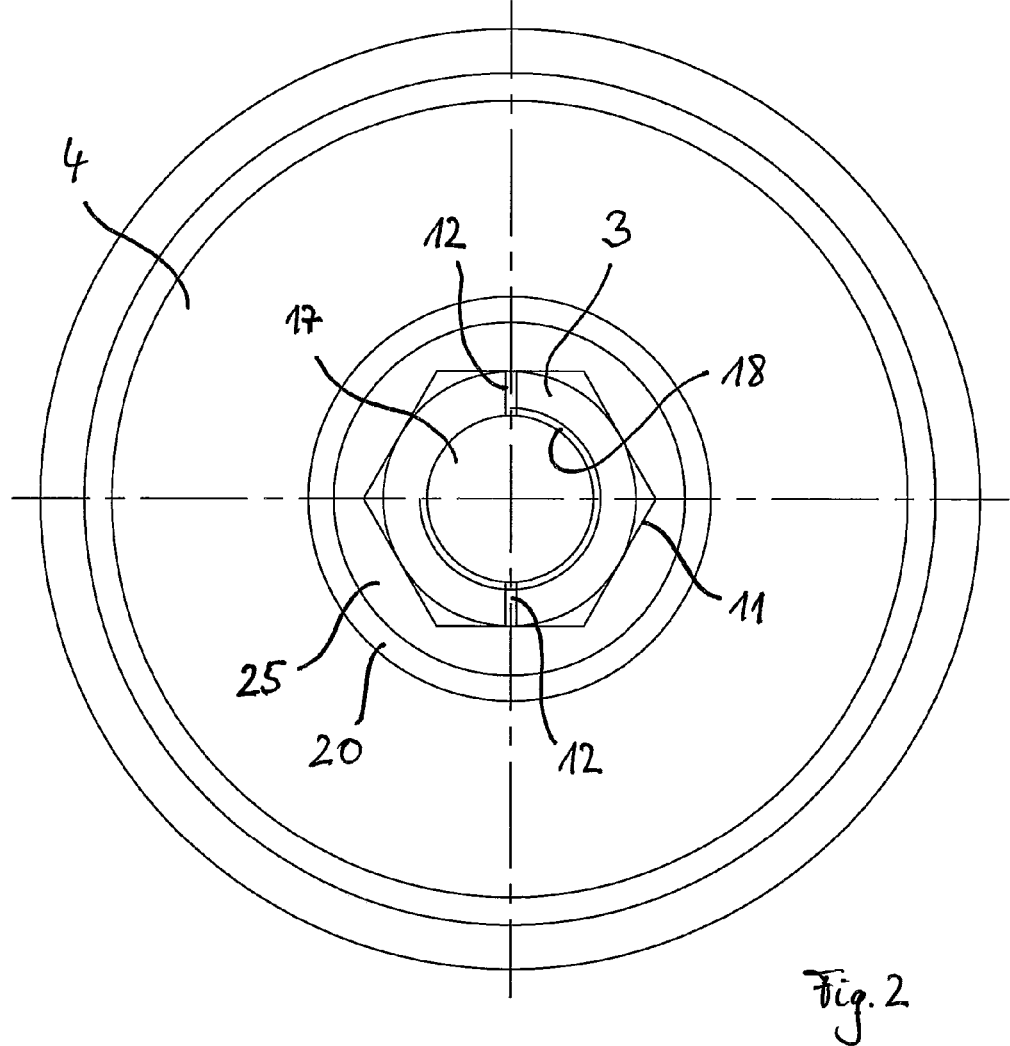
FIG. 2: top view of the anchor head from FIG. 1.

The body of the anchor nut 3 has a conical support region 7, which in the assembled state engages in the anchor plate opening 8 of the anchor plate 4. There, the conical support region 7 of the anchor nut 3 is supported by a complementary inner cone 9, which the anchor plate 4 comprises as circumferential wall of the anchor plate opening 8. Both the conical support region 7 and also the inner cone 9 in this case are embodied in a self-locking manner with a cone angle of 7.5°.

The end of the conical support region 7 on the air side is followed by a head region 10 of the anchor nut 3, which for assembly and for exerting the preload is provided with an outer hexagon 11.

To increase the load carrying capacity and for achieving higher strength values, the anchor nut 3 comprises two slots 12 which are each located diametrically opposite one another and run axially parallel, which interrupt the nut wall in each case over the length of their axial extension. According to the invention, these slots 12 are arranged so that they commence on the end 13 of the anchor nut 3 on the air side and end at a clear distance 14 from the end 15 of the anchor nut 3 on the sub-surface side. In the exemplary embodiments of the FIGS. 1, 3 and 4 the slots 12, starting out from the end 13 on the air side, extend over a length amounting to between 80% and 85% of the entire axial length of the anchor nut 3.

Here, the two slots 12 separate the head region 10 and a predominant part of the conical support region 7 into two segments 10a and 10b. Only the end of the conical support region 7 on the sub-surface side with the smaller diameter is designed continuously over the entire circumference at a height 14 of approximately 15% to 20% of the axial length of the anchor nut 3.

In the direction of the longitudinal axis 16, the anchor nut 3 is provided with a continuous threaded bore 17, the internal thread 18 of which is adapted to the wave-like special thread profile 19 of the tension anchor 2. Accordingly, the anchor nut 3 can be initially easily screwed onto the tension anchor 2 with little play whereas later on upon radial compression or clamping of the conical support region 7 the internal thread 18 of the anchor nut 3 in the inner cone 9 is fixed without play and slip on the thread 19 of the tension anchor 2.

Outside, i.e. on the surface on the air side facing away from the sub-surface 6, the anchor plate 4 comprises a concentric elevation formed in the manner of a truncated cone in this case, which forms a collar 20, which, centred, comprises the anchor plate opening 8 with the inner cone 9. On the surface on the sub-surface side facing the sub-surface 6 the collar 20 likewise protrudes with a region 21, which in the assembled state engages in the anchor bore 5.

Figure 3:
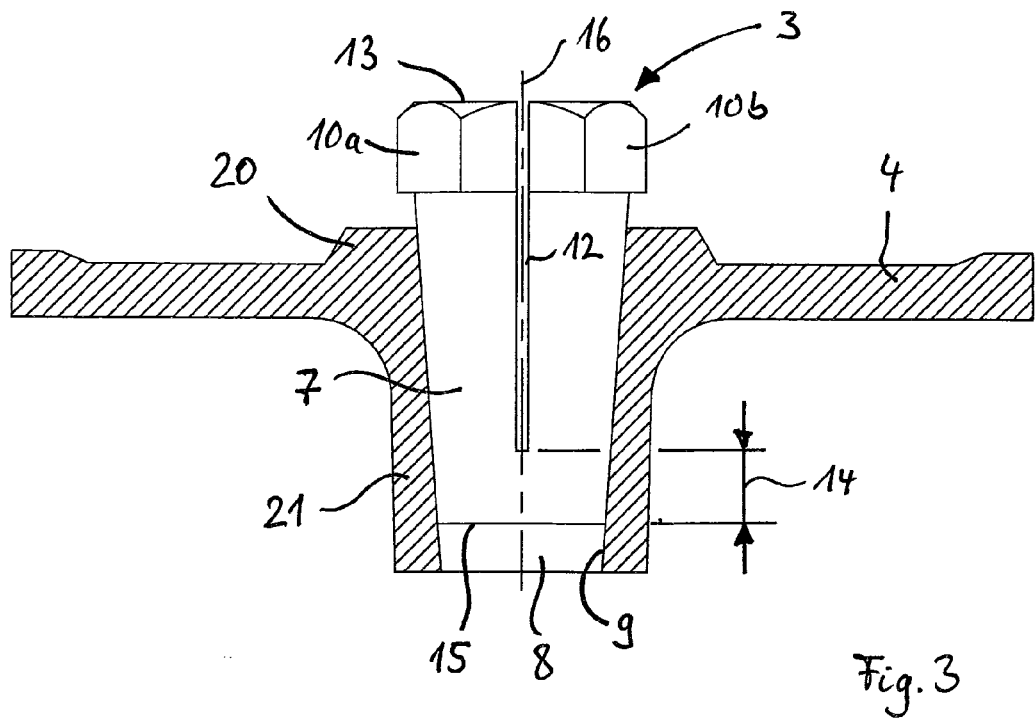
FIG. 3: cross section through a second embodiment of an anchor head according to the invention.
Figure 4:
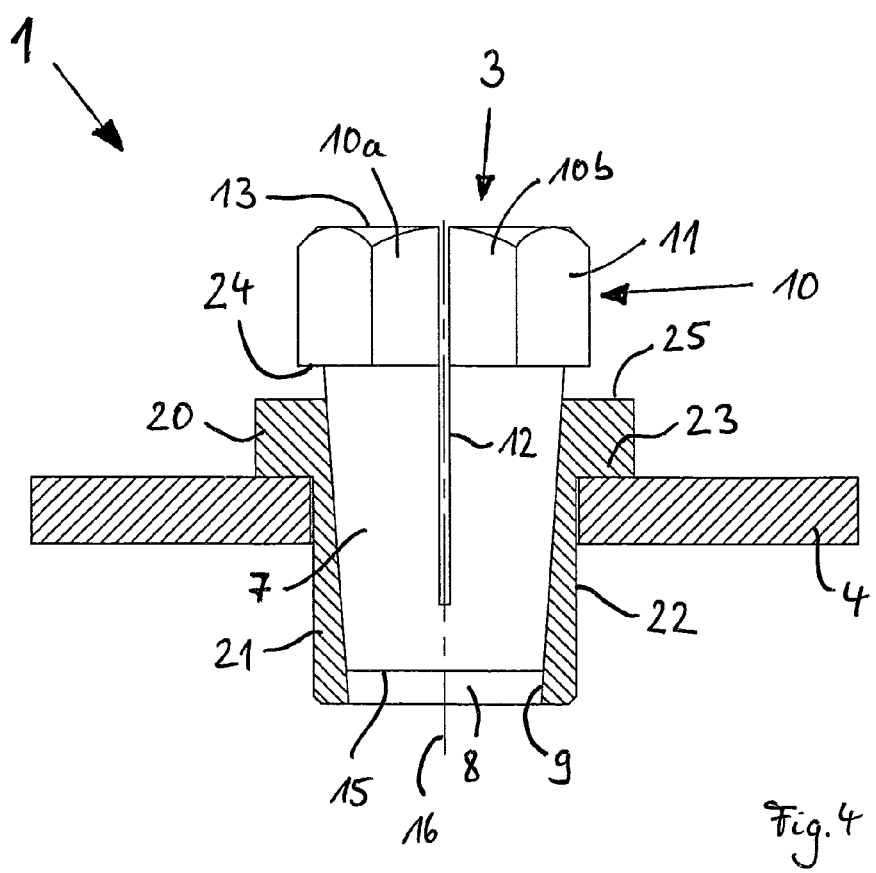
FIG. 4: cross section through a third embodiment of an anchor head according to the invention.
Figure 5:
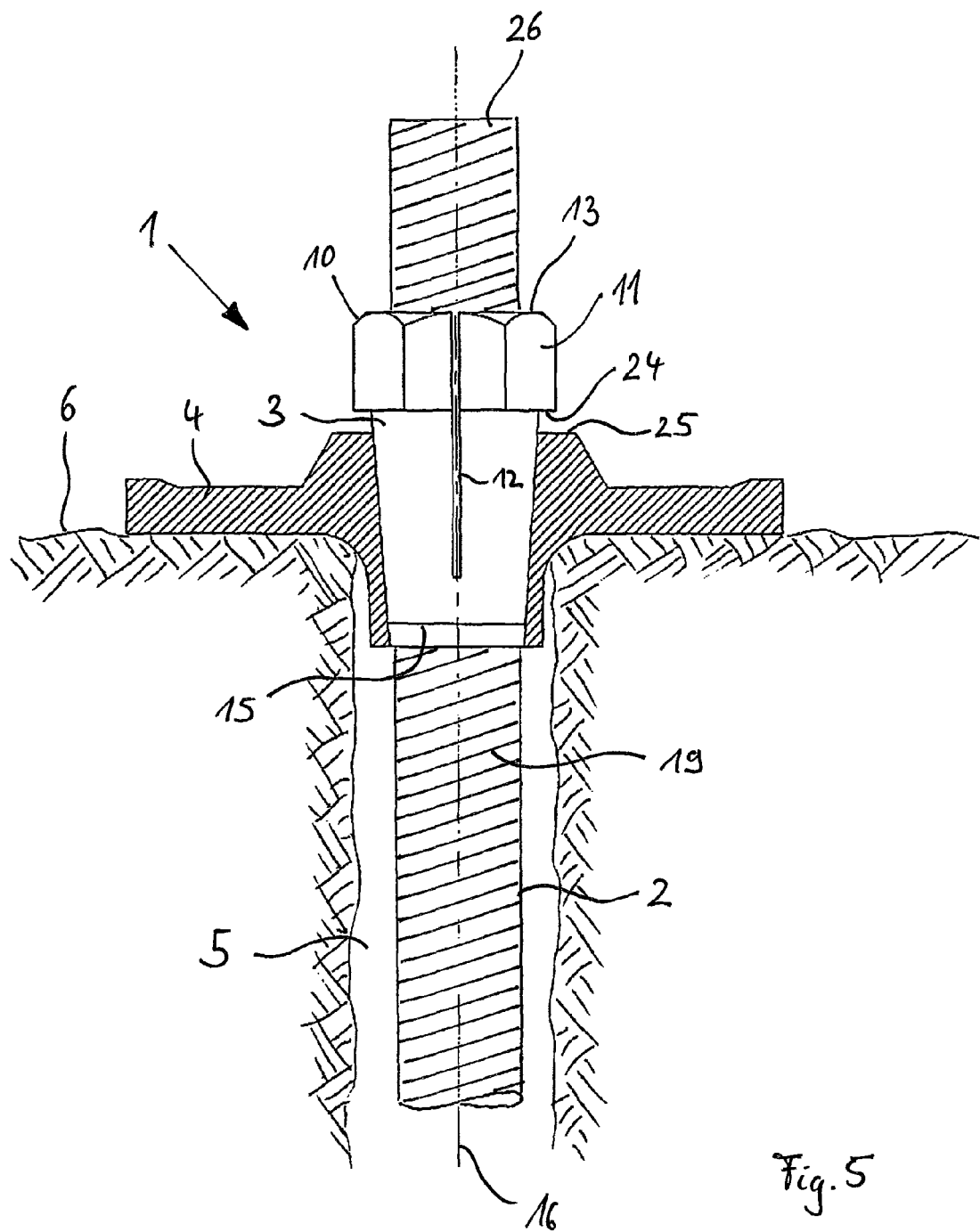
FIG. 5: tension anchor with the anchor head from FIG. 3 in the installed state.

Depending on application, the protrusion of this collar region 21 on the sub-surface side can differ in size (FIGS. 1 and 3). In the case of the exemplary embodiment shown in FIG. 4, the collar 20 including its region 21 on the sub-surface side is formed in a separate insert element 22, which is inserted in the anchor plate opening 8 of the anchor plate 4. Here it radially abuts the surface of the anchor plate 4 on the air side with a stop shoulder 23 radially protruding outwardly from the collar 20 on the air side.

The head region 10 of the anchor nut 3 has a suddenly enlarged diameter, as a result of which on the end face of the head region 10 on the sub-surface side a stop surface 24 is formed which runs perpendicularly to the longitudinal axis 16 of the anchor nut 3. This stop surface 24 can abut a complementary stop surface 25, which is formed on the surface of the collar 20 of the anchor plate 4 on the air side. By way of this positive connection, further pulling of the conical support region 7 of the anchor nut 3 into the inner cone 9 of the anchor plate 4 is then prevented.

During the assembly of the individual tension anchor 2, the two-part anchor head 1, which consists of the anchor nut 3 and the anchor plate 4, is preassembled on the anchor shaft end 26 and the tension anchor 2 then transferred into the anchor bore 5 preferentially filled with glue cartridges. In the process, the anchor nut 3 following the hardening of the synthetic resin can be initially tightened conventionally by means of a torque and the tension anchor 2 tensioned via the two-piece anchor head 1 in this way.

During the tightening of the anchor nut 3 the same runs with the conical support region 7 into the inner cone 9 of the anchor plate 4 on the end side. The end of the conical support region 7 of the anchor nut 3 on the air side is radially compressed in the process because of the slotting 12, as a result of which the radial thread play even now is at least almost completely eliminated, which results in the anchor nut 3 being clamped in the anchor plate 4. Because of the positive connection with the external thread 19 of the tension anchor 2, the internal thread 18 in this case prevents axial movement of the anchor nut 3.

The invention claimed is:

1. An anchor head (1) for anchoring a tension anchor (2) on an air side of an anchor bore (5) said anchor head, comprising
   an anchor nut (3) with a threaded bore (17) for screwing onto an anchor thread (19) of a tension anchor (2), and
   an anchor plate (4) interacting with the anchor nut (3), the anchor plate (4) having an anchor plate opening (8),
   wherein the anchor nut (3) has a conical support region (7) and wherein the anchor plate (4) has a complementary inner cone (9), at least in the region of the anchor plate opening (8)
   wherein in an assembled state of the anchor nut (3) and the anchor plate (4), the anchor nut (3) engages in the anchor plate opening (8) of the anchor plate (4),
   wherein the anchor nut (3) is supported on the complementary inner cone (9) of the anchor plate (4),
   and wherein the anchor nut (3) comprises at least one slot (12), which interrupts a nut wall over a part region of an axial extension of the anchor nut (3),
   wherein the at least one slot (12) opens into an end (13) of the anchor nut (3) on the air side and in that starting out from there the slot (12) extends over a length between 25% and 90% of an entire axial length of the anchor nut (3).

2. The anchor head (1) of claim 1, wherein a nut wall in a region (14) of the conical support region (7) on a sub-surface side is formed continuously without interruption over an entire circumference of said nut wall.

3. The anchor head (1) of claim 1, wherein circumferential regions of the nut wall which are in the axial extension region of the at least one slot (12) are formed as predetermined breakage points which break when a predetermined load is exceeded.

4. The anchor head (1) of claim 1, wherein the anchor nut (3) comprises multiple slots (12), which are evenly distributed over a circumference of the nut wall.

5. The anchor head (1) of claim 1, wherein during anchoring of a tension anchor (2) a region having the at least one slot (12) on the end (13) of the anchor nut (3) on the air side is compressed inwardly by the conical support region (7) entering the inner cone (9) of the anchor plate (4), wherein radial and axial thread play between the tension anchor (2) and the anchor nut (3) is reduced.

6. The anchor head (1) of claim 1, wherein the end of the conical support region (7) of the anchor nut (3) on the air side is followed by a head region (10) with a stop surface (24) on a sub-surface side, which with respect to the longitudinal axis (16) of the anchor nut (3) is inclined at an angle that is greater than an angle at which the conical support region (7) is inclined with respect to a longitudinal axis (16) of the anchor nut (3).

7. The anchor head (1) of claim 1, wherein the end of the conical support region of the anchor nut (3) on the air side is followed by a head region (10) with an abrupt enlargement of diameter wherein an end face of the head region (10) on the sub-surface side forms a stop surface (24) running perpendicularly to a longitudinal axis (16) of the anchor nut (3).

8. The anchor head (1) of claim 6, wherein a region of the conical support region (7) following the head region (10) of the anchor nut (3) comprises a scale and/or at least one colour marking.

9. The anchor head (1) of claim 1, wherein the anchor plate (4) comprises a collar (20) surrounding the anchor plate opening (8), in which the inner cone (9) is formed, the collar (20) completely or predominantly extending on a sub-surface side of the anchor plate (4).

10. The anchor head (1) of claim 9, wherein the collar (20) is formed in a separate insert element (22), which with a cylindrical collar region (21) is inserted into the anchor plate opening (8) of the anchor plate (4) and with a stop shoulder (23) protruding outwards from the collar region (21) abuts a surface of the anchor plate (4) on an air side.

11. The anchor head (1) of claim 1, wherein at least one of the conical support region (7) of the anchor nut (3) and the complementary inner cone (9) of the anchor plate (4) is provided with a friction-reducing coating.

12. The anchor head (1) of claim 1, wherein the anchor nut (3) and/or the anchor plate (4) consists of fibre-reinforced plastic.

13. An anchor nut (3) for an anchor head (1) for anchoring a tensioning anchor (2) on an air side of an anchor bore (5) wherein the anchor nut (3) comprises a nut body which extends in axial longitudinal direction (16) between an end (13) on the air side and an end (15) on a sub-surface side of the anchor nut (3), and which comprises a thread bore (17) running in longitudinal direction (16) for screwing onto an anchor thread (19) of a tension anchor (2) and a conical support region (7), a larger diameter region of which faces the end (13) of the anchor nut (3) on the air side and a small diameter region of which faces the end (15) of the anchor nut (3) on the sub-surface side, wherein the anchor nut (3) comprises at least one slot (12), which interrupts the nut wall over a part region of an axial extension of the anchor nut (3), and wherein the at least one slot (12) opens into the end (13) of the anchor nut (3) on the air side and starting out from there the at least one slot (12) extends over a length which is between 25% and 90% of the entire axial length of the anchor nut (3).

14. The anchor nut (3) of claim 13, wherein the nut wall in a region (14) of the conical support region (7) on a sub-surface side is formed continuously without interruption over an entire circumference of said nut wall.

15. The anchor nut (3) of claim 13, wherein circumferential regions of the nut wall remaining in extension of the at least one slot (12) are formed as a predetermined breakage point which breaks when a predetermined load is exceeded.

16. The anchor nut (3) of claim 13, wherein the anchor nut (3) comprises two slots (12) which are evenly distributed over a circumference of the nut wall.

17. The anchor nut (3) of claim 13, wherein the end of the conical support region (7) of the anchor nut (3) on the air side is followed by a head region (10) with a stop surface (24) on a sub-surface side, which with respect to the longitudinal axis (16) of the anchor nut (3) is inclined at an angle that is greater than an angle at which the conical support region (7) is inclined with respect to a longitudinal axis (16) of the anchor nut (3).

18. The anchor nut (3) of claim 13, wherein the end of the conical support region of the anchor nut (3) on the air side is followed by a head region (10) with an abrupt enlarged diameter wherein an end face of the head region (10) on the sub-surface side forms a stop surface (24) running perpendicularly to a longitudinal axis (16) of the anchor nut (3).

19. The anchor nut (3) of claim 13, wherein the region of the conical support region (7) following the head region (10) of the anchor nut (3) comprises a scale and/or at least one colour marking.

20. The anchor head (1) of claim 1, wherein the anchor nut (3) comprises two slots (12) which are evenly distributed over a circumference of the nut wall.

\* \* \* \* \*